(12) United States Patent
Mawatari et al.

(10) Patent No.: US 11,572,633 B2
(45) Date of Patent: Feb. 7, 2023

(54) TIN-PLATED COPPER TERMINAL MATERIAL AND METHOD OF MANUFACTURING THE SAME

(71) Applicant: MITSUBISHI MATERIALS CORPORATION, Tokyo (JP)

(72) Inventors: Fuyumi Mawatari, Aizuwakamatsu (JP); Kazunari Maki, Aizuwakamatsu (JP); Shinichi Funaki, Aizuwakamatsu (JP); Yuki Inoue, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/041,088

(22) PCT Filed: Mar. 29, 2019

(86) PCT No.: PCT/JP2019/014111
§ 371 (c)(1),
(2) Date: Sep. 24, 2020

(87) PCT Pub. No.: WO2019/189799
PCT Pub. Date: Oct. 3, 2019

(65) Prior Publication Data
US 2021/0108325 A1   Apr. 15, 2021

(30) Foreign Application Priority Data

Mar. 30, 2018   (JP) .............................. JP2018-067620

(51) Int. Cl.
*C25D 5/00*   (2006.01)
*B32B 15/01*   (2006.01)
(Continued)

(52) U.S. Cl.
CPC .............. *C25D 5/627* (2020.08); *B32B 15/01* (2013.01); *B32B 15/20* (2013.01); *C25D 5/12* (2013.01);
(Continued)

(58) Field of Classification Search
CPC ......... B32B 7/12; B32B 15/08; B32B 15/085; B32B 15/088; B32B 15/09; B32B 15/18;
(Continued)

(56) References Cited

U.S. PATENT DOCUMENTS

2009/0053553 A1* 2/2009 Masago ................... B32B 15/01
428/647
2011/0266035 A1* 11/2011 Sakurai ..................... C25D 5/50
29/829

(Continued)

FOREIGN PATENT DOCUMENTS

EP   2351875 A1   8/2011
EP   3572558 A1   11/2019
(Continued)

OTHER PUBLICATIONS

International Search Report dated May 14, 2019, issued for PCT/JP2019/014111.
(Continued)

*Primary Examiner* — Xiaobei Wang
(74) *Attorney, Agent, or Firm* — Locke Lord LLP; James E. Armstrong, IV; Nicholas J. DiCeglie, Jr.

(57) ABSTRACT

A tin-plated copper terminal material in which on a substrate made of copper or copper alloy, a nickel-or-nickel-alloy layer, a copper-tin alloy layer, and a tin layer are laminated in this order; in this material, the tin layer has an average thickness 0.2 μm to 1.2 μm inclusive; the copper-tin alloy layer is a compound alloy layer in which $Cu_6Sn_5$ is a main ingredient and part of copper in the $Cu_6Sn_5$ is substituted
(Continued)

with nickel, and an average crystal grain size is 0.2 μm to 1.5 μm inclusive; part of the copper-tin alloy layer appears on a surface of the tin layer and tin solidification parts exist like islands; and the tin solidification parts have an average diameter 10 μm to 1000 μm inclusive in a direction along the surface of the tin layer and an area ratio to the surface of the tin layer 1% to 90% inclusive.

6 Claims, 2 Drawing Sheets

(51) Int. Cl.
| | | |
|---|---|---|
| *B32B 15/20* | (2006.01) | |
| *C25D 5/12* | (2006.01) | |
| *C25D 5/50* | (2006.01) | |
| *C25D 7/00* | (2006.01) | |
| *H01R 13/03* | (2006.01) | |
| *H01R 43/16* | (2006.01) | |

(52) U.S. Cl.
CPC ............ *C25D 5/50* (2013.01); *C25D 5/611* (2020.08); *C25D 5/617* (2020.08); *C25D 7/00* (2013.01); *H01R 13/03* (2013.01); *H01R 43/16* (2013.01); *B32B 2457/00* (2013.01)

(58) Field of Classification Search
CPC ....... B32B 15/20; B32B 27/281; B32B 27/32; B32B 27/34; B32B 27/36; B32B 27/38; B32B 2255/06; B32B 2255/205; B32B 2255/24; B32B 2307/306; B32B 2307/406; B32B 2307/538; B32B 2307/752; B32B 2457/08; C23C 18/1651; C25D 1/04; C25D 3/38; C25D 3/58; C25D 5/022; C25D 5/48; C25D 7/00; C25D 7/0614; H05K 1/021; H05K 3/205; H05K 3/384; H05K 3/386; H05K 3/389; H05K 3/4655; H05K 2201/0154; H05K 2201/0355; H05K 2201/0358; H05K 2203/0307; H05K 2203/0723; Y10T 428/12708; Y10T 428/12715; Y10T 428/12944; Y10T 428/265
USPC ........................................................ 428/336
See application file for complete search history.

(56) References Cited

U.S. PATENT DOCUMENTS

| | | | |
|---|---|---|---|
| 2013/0196171 A1* | 8/2013 | Taninouchi | ............. C25D 5/12 |
| | | | 428/553 |
| 2014/0004373 A1 | 1/2014 | Taninouchi et al. | |
| 2014/0287262 A1* | 9/2014 | Kato | ..................... C25D 5/505 |
| | | | 428/647 |
| 2017/0283910 A1 | 10/2017 | Tsuru et al. | |
| 2017/0298527 A1 | 10/2017 | Kato et al. | |
| 2019/0362865 A1* | 11/2019 | Inoue | ..................... H01R 43/16 |

FOREIGN PATENT DOCUMENTS

| | | | | |
|---|---|---|---|---|
| JP | H02173275 A | | 7/1990 | |
| JP | H02173279 A | | 7/1990 | |
| JP | H11-350188 A | | 12/1999 | |
| JP | 2002-069688 A | | 3/2002 | |
| JP | 2010-168598 A | | 8/2010 | |
| JP | 2010-265489 A | | 11/2010 | |
| JP | 2016056424 A | * | 4/2014 | ............... C25D 7/00 |
| JP | 2014-240520 A | | 12/2014 | |
| JP | 2016-44358 A | | 4/2016 | |
| JP | 2016-056424 A | | 4/2016 | |
| JP | 2016-156051 A | | 9/2016 | |
| TW | 201029018 A | | 8/2010 | |
| TW | 201625821 A | | 7/2016 | |

OTHER PUBLICATIONS

Extended European Search Report issued in correspoding European Patent Application No. EP 19776772.6, dated Nov. 24, 2021.
First Examination Report issued in corresponding Indian Patent Application No. IN 202017046184, dated Feb. 1, 2022.
Office Action issued in corresponding Taiwanese Patent Application No. TW 108111365, dated May 5, 2022.

* cited by examiner

TIN-PLATED COPPER TERMINAL MATERIAL AND METHOD OF MANUFACTURING THE SAME

CROSS-REFERENCE TO RELATED APPLICATIONS

This application is a U.S. National Stage application under 35 U.S.C. § 317 of International Patent Application Serial No. PCT/JP2019/014111, filed Mar. 29, 2019, which claims priority to Japanese Application No. 2018-067620, filed Mar. 30, 2018, the disclosures of each of which are expressly incorporated by reference in their entireties.

BACKGROUND OF THE INVENTION

Technical Field

The present invention relates to a connector terminal used for connecting electrical wiring of vehicles, consumer products and the like, a tin-plated copper terminal material especially useful for a terminal for multi-pin connectors, and a manufacturing method thereof.

Background Art

In recent automotive industry, electrification is rapidly advanced; and connectors are notably reduced in size and increased in pins in electronic devices in which functions are increased and highly integrated. By increment of the pins in a connector, a large force is necessary for fitting the connector for a whole connector even though an insertion force per a pin is small; and there is concern of deterioration of productivity. Accordingly, it is attempted to reduce friction coefficient of a tin-plated terminal material and to reduce an insertion force per single pin.

For example, a terminal material of Patent Document 1 is proposed for complying with such a request. This terminal material enables to reduce dynamic friction coefficient and reduce the insertion force by growing copper-tin intermetallic compound under a tin layer on a surface into a columnar shape to be exposed on a surface of the tin layer evenly and finely.

Furthermore, Patent Document 2 discloses that a surface roughness Ra on an outermost surface along an orthogonal direction to a rolling is 0.05 µm or lower by making one radiate solidification structure of tin per 35 mm² exist on a surface of a tin layer. This radiate solidification structure of tin is formed by reflowing a substrate on which tin plating and the like is carried out to heat to a prescribed temperature and then spraying cold water; and said to make the surface roughness smaller. Also in this Patent Document 2, the copper-tin alloy layer is exposed on a surface of the tin layer at an area ratio 40% or lower.

CITATION LIST

Patent Document

Patent Document 1: Japanese Patent Unexamined Application, First Publication No. 2014-240520
Patent Document 2: Japanese Patent Unexamined Application, First Publication No. 2016-156051

SUMMARY OF INVENTION

Technical Problem

The pins of the connector are further increased; a quantity of electricity is increased by down-sizing of the electronic devices; and usage in high temperature environment as in a vicinity of an engine bay is increased, and furthermore, high heat resistance is also required for the terminals. In this point, in the above-mentioned prior arts, copper-tin alloy exposed at the surface is oxidized when left in high temperature for a long time, and it is concerned to increase contact resistance; therefore, it is hard to say that those are suitable for usage for a long time in high temperature. Accordingly, material in which the contact resistance will not be largely increased even if used in high temperature for a long time is required.

The present invention is achieved in consideration of the above circumstances, and has an object to suppress increase of the contact resistance in high temperature while good electric connection characteristic and insertion/extraction characteristic are maintained as the terminals, and improve high temperature reliability.

Solution to Problem

Assiduously researching, the present inventors found that increase of the contact resistance can be suppressed even after used in high temperature for a long time by intendedly providing cohesion parts of tin on a surface.

A tin-plated copper terminal material of the present invention is a tin-plated copper terminal material formed by laminating a nickel-or-nickel-alloy layer, a copper-tin alloy layer, and a tin layer in this order on a substrate made of copper or copper alloy; in which the tin layer has an average thickness not less than 0.2 µm and not more than 1.2 µm; the copper-tin alloy layer is a compound alloy layer having $Cu_6Sn_5$ as a main ingredient, in which some copper in the $Cu_6Sn_5$ are substituted with nickel, having an average crystal grain size not less than 0.2 µm and not more than 1.5 µm; the copper-tin alloy layer appears in part on a surface of the tin layer and tin solidification parts upheaved from the surface of the tin layer exist like islands; and the tin solidification parts have an average diameter in a direction along the surface of the tin layer of not less than 10 µm and not more than 1000 µm and an area ratio to the surface of the tin layer not less than 1% and not more than 90%.

Here, "a nickel layer or a nickel alloy layer" is termed the "nickel-or-nickel-alloy layer".

The reason to set the average thickness of the tin layer to be not less than 0.2 µm and not more than 1.2 µm is as follows: if it is less than 0.2 µm, electric connection reliability may be deteriorated; and if it is more than 1.2 µm, a surface layer is not formed to be a composite structure of tin and copper tin alloy and occupied by solely tin, so dynamic friction coefficient is increased. An upper limit thickness of the tin layer is preferably not more than 1.1 µm, more desirably not more than 1.0 µm.

In the copper-tin alloy layer, it is possible to make a boundary surface to the tin layer a sharp and uneven shape since the main ingredient is $Cu_6Sn_5$ and $Cu_6Sn_5$ alloy in which copper in the $Cu_6Sn_5$ is in part substituted by nickel exist. Moreover, the reason to set the average crystal grain size of the copper-tin alloy layer is not less than 0.2 µm and not more than 1.5 µm is as follows: if it is less than 0.2 µm, the copper-tin alloy layer is excessively minute and not sufficiently grow in a vertical direction (a normal direction to the surface) to appear on the surface, so that it is not possible to make the dynamic friction coefficient at a surface of the terminal material 0.3 or less; and if it is more than 1.5 µm, it grows largely in a lateral direction (a direction perpendicular to the normal direction to the surface) and is not be a sharp uneven shape, so that likewise it is not possible to make the dynamic friction coefficient 0.3 or less.

A lower limit of the average crystal grain size of the copper-tin alloy layer is preferably 0.3 μm or more, more preferably 0.4 μm or more, even more preferably 0.5 μm or more. An upper limit of the average crystal grain size of the copper-tin alloy layer is preferable 1.4 μm or less, more preferably 1.3 μm or less, even more preferably 1.2 μm or less.

Part of the copper-tin alloy layer is exposed on the surface of the tin layer, and the tin solidification parts which are different from that exist like islands. In the part where the tin solidification parts exist, since tin remains even while used in high temperature, oxidation of copper-tin alloy is prevented from spreading and it is possible to suppress increase of the contact resistance. In this case, if the average diameter of the tin solidification parts is less than 10 μm or the area ratio of the tin solidification parts is less than 1%, an effect of suppressing increase of the contact resistance is poor; and if the average diameter is more than 1000 μm or the area ratio is more than 90%, the friction coefficient at the surface is increased and the insertion/extraction characteristic is deteriorated.

As a preferable embodiment of the tin-plated copper terminal of the present invention, it is preferable that a maximum thickness of the tin solidification parts be not less than 0.1 μm and not more than 10 μm.

If the maximum thickness of the tin solidification parts is less than 0.1 μm, an effect of decreasing of the contact resistance under high temperature is poor; if it is more than 10 μm, the friction coefficient is easy to be enlarged. The maximum thickness of the tin solidification parts is preferably not less than 0.3 μm and less than 8.0 μm. More preferably, it is not less than 0.5 μm and not more than 7.0 μm.

As a preferred embodiment of the tin-plated copper terminal of the present invention, it is preferable that an exposed area ratio of the copper-tin alloy layer be not less than 1% and not more than 60% to the surface of the tin layer except for the tin solidification parts.

If the exposed area ratio of the copper-tin alloy layer to the surface of the tin layer is less than 1%, it is difficult to make the dynamic friction coefficient not more than 0.3; and if it is more than 60%, the electric connection characteristic may be deteriorated. Desirably, a lower limit of the area ratio is 1.5% or more and an upper limit is 50% or less. More desirably, the lower limit is 2% or more and the upper limit is 40% or less.

A method of manufacturing a tin-plated copper terminal material of the present invention is a method by forming a nickel-or-nickel-alloy plating layer, a copper plating layer, and a tin plating layer in this order on a substrate made of copper or copper alloy, and then carrying out a reflow treatment, manufacturing the terminal material formed by laminating a nickel-or-nickel-alloy layer, a copper-tin alloy layer, and a tin layer in order on the substrate. In this method, a thickness of the nickel-or-nickel-alloy plating layer is not less than 0.05 μm and not more than 1.0 μm; a thickness of the copper plating layer is not less than 0.05 μm and not more than 0.40 μm; a thickness of the tin plating layer is not less than 0.5 μm and not more than 1.5 μm; and the reflow treatment includes a heat treatment step in which after a primary heating treatment heating to 240° C. or higher at a heating rate not less than 20° C./second and not more than 75° C./second, a secondary heating treatment heating at temperature not less than 240° C. and not more than 300° C. for not less than one second and not more than 15 seconds is carried out; a primary cooling step cooling at a cooling rate not more than 30° C./second for not less than 2 seconds and not more than 15 seconds after the heat treatment step; and a secondary cooling step cooling at a cooling rate not less than 100° C./second and not more than 300° C./second after the primary cooling.

Here, "a nickel layer or a nickel alloy layer" is termed the "nickel-or-nickel-alloy layer". "A nickel plating layer or a nickel alloy layer" is termed the "nickel-or-nickel-alloy plating layer".

By plating the substrate with nickel or nickel alloy, (Cu, Ni)$_6$Sn$_5$ alloy is formed after the reflow treatment, so that an uneven shape of the copper-tin alloy layer is sharp, and the dynamic friction coefficient can be 0.3 or less.

If the thickness of the nickel-or-nickel-alloy plating layer is less than 0.05 μm, nickel content contained in (Cu, Ni)$_6$Sn$_5$ alloy is small, so that copper-tin alloy having the sharp uneven shape cannot be formed; and if it is more than 1.0 μm, it is difficult to carry out bending machining and the like.

In a case in which the nickel-or-nickel-alloy layer is made to have function as a barrier layer preventing diffusion of copper from the substrate to improve heat resisting property and in a case to improve the abrasion resistance, it is preferable that the thickness of the nickel-or-nickel-alloy plating layer be 0.1 μm or more. The plating layer is not limited to pure nickel, nickel alloy such as nickel cobalt (Ni—Co), nickel tungsten (Ni—W) and the like are also appropriate.

If the thickness of the copper plating layer is less than 0.05 μm, since the nickel content contained in (Cu, Ni)$_6$Sn$_5$ alloy is large, the shape of the copper-tin alloy is too minute and cannot grow in the vertical direction (a normal line direction to the surface) to the degree to be exposed at the surface, so that the dynamic friction coefficient cannot be reduced to 0.3 or less; and if it is more than 0.4 μm, since the nickel content contained in (Cu, Ni)$_6$Sn$_5$ alloy is small, it grows largely in a lateral direction (a direction perpendicular to the direction of the normal line to the surface), so that the copper-tin alloy layer having the sharp uneven shape is not formed.

If the thickness of the tin plating layer is less than 0.5 μm, the tin layer after reflowing is thin and the electric connection characteristic is deteriorated; and if it is more than 1.5 μm, appearance of the copper-tin alloy layer to the surface is small and the dynamic friction coefficient is difficult to be 0.3 or less.

By carrying out the heating step by heating treatment with two different stages of conditions in the reflow treatment, the tin solidification parts are easily generated. By rapidly heating in the primary heating treatment so as to make a high temperature state of 240° C. or higher in an early stage and then treating the secondary heating at temperature not less than 240° C. and not more than 300° C., time for melting the tin layer on the surface is maintained long.

Thereby, in conjunction with that the copper-tin alloy layer with the sharp uneven boundary surface to the tin layer partly appears on the surface, melted tin is repelled by the copper-tin alloy layer and condensed. In this case, if the heating rate in the primary heating is less than 20° C./second, copper atoms are diffused with precedence in grain boundaries of tin and intermetallic compound abnormally grow in vicinity of the grain boundaries until the tin plating is melted, so that the copper-tin alloy layer having the sharp uneven shape cannot be formed. By contrast, if the heating rate is more than 75° C./second, the intermetallic compound insufficiently grows, so it is not possible to obtain a desired intermetallic compound layer in the subsequent cooling.

If the attainment temperature in the primary heat treatment is less than 240° C., tin is insufficiently melted, so desired tin solidification parts cannot be obtained. In the secondary heating treatment, temperature may be increased or decreased in some extent or held at specific temperature if it is in a range of not less than 240° C. and not more than 300° C.; however, if the heat treatment time is more than 15 seconds, the tin solidification parts are excessive and the dynamic friction coefficient is large. If it is less than one second, tin is insufficiently melted, and the desired tin solidification parts are not formed. If there is heating or cooling from the attainment temperature of the primary heating treatment, the time for the secondary heating treatment includes also those time. A peak temperature in the secondary heating treatment is more preferably 250° C. or higher.

If the peak temperature in the heat treatment step is less than 240° C., tin is not evenly melted; and the peak temperature is more than 300° C., it is not desirable since the tin solidification parts are excessive.

In the cooling step, by providing the primary cooling step in which the cooling rate is small, copper atoms are gently diffused in tin grains, so that a desired intermetallic compound structure grows. If the cooling rate in the primary cooling step is more than 30° C./second, the intermetallic compound cannot sufficiently grow under the influence of rapid cooling, so the copper-tin alloy layer is not sufficiently exposed at the surface. The intermetallic compound cannot sufficiently grow likewise if the cooling time is less than two seconds. If the cooling time is more than 15 seconds, $Cu_6Sn_5$ alloy grows excessively to be coarse; a nickel tin compound layer may be formed under the copper-tin alloy layer depending on the thickness of the copper plating layer; and the barrier property of the nickel-or-nickel-alloy layer may be deteriorated.

Air cooling is appropriate for this primary cooling step. After this primary cooling step, it is rapidly cooling in the secondary cooling step and the growth of the intermetallic compound layer is finished by a desired structure. If the cooling rate in the secondary cooling step is less than 100° C./second, the intermetallic compound furthermore grows and a desired shape of intermetallic compound cannot be obtained.

As a preferred embodiment of the method of manufacturing the tin-plated copper terminal material of the present invention, it is preferable that in the reflow treatment, while the substrate on which the nickel-or-nickel-alloy plating layer, the copper plating layer, and the tin plating layer be driven in a surface direction thereof, a hot blast be blown against a surface of the substrate along a driven direction thereof to heat the surface of the substrate.

Advantageous Effects of Invention

According to the present invention, it is possible to reduce the contact resistance while good electric connection characteristic and insertion/extraction characteristic are maintained as the terminals, and improve high temperature reliability.

DESCRIPTION OF EMBODIMENTS

A tin-plated copper terminal material of an embodiment of the present invention will be explained. Hereinafter, "a nickel layer or a nickel alloy layer" will be called as "a nickel-or-nickel-alloy layer". "A nickel-plating layer or a nickel-alloy plating layer" will be called as "a nickel-or-nickel-alloy plating layer".

Figure 1:
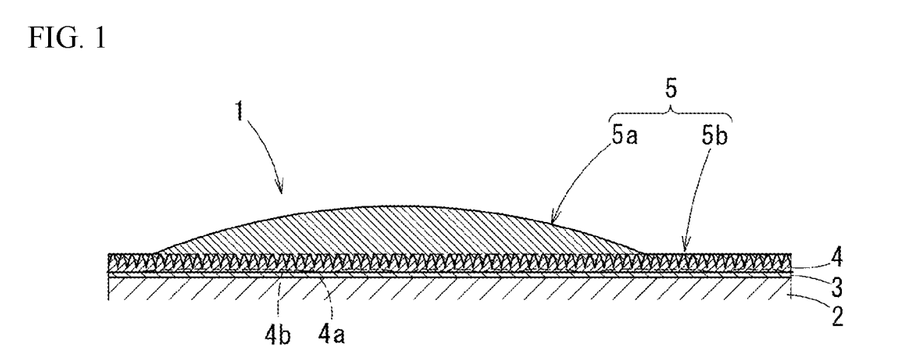
FIG. 1 is a sectional view schematically showing a tin-plated copper terminal material of an embodiment.

In a tin-plated copper terminal alloy 1 of the present embodiment, on a substrate 2 made of copper or copper alloy, a nickel-or-nickel-alloy layer 3, a copper-tin alloy layer 4, and a tin layer 5 are laminated in this order.

The substrate 1 is not specifically limited in composition thereof if it is made of copper or copper alloy.

The nickel-or-nickel-alloy layer 3 is a layer made of pure nickel, nickel alloy such as nickel cobalt (Ni—Co), nickel tungsten (Ni—W) and the like.

The nickel-or-nickel-alloy layer 3 is not necessarily limited but has an average thickness of not less than 0.05 μm and not more than 1.0 μm, an average crystal grain size of not less than 0.01 μm and not more than 0.5 μm, a standard deviation of crystal grain size/the average crystal grain size of 1.0 or less, and arithmetic mean roughness Ra on a surface which is in contact with a copper-tin alloy layer of not less than 0.005 μm and not more than 0.5 μm.

If the average thickness of the nickel-or-nickel-alloy layer 3 is less than 0.05 μm, Ni content in $(Cu, Ni)_6Sn_5$ alloy is small and it is hard to form the copper-tin alloy layer having a sharp uneven shape; or if it is more than 1.0 μm, it is difficult to carrying out bend machining and the like. The average thickness of the nickel-or-nickel-alloy layer 3 is preferably 0.075 μm or more; more preferably 0.1 μm or more. In addition, in a case in which the nickel-or-nickel-alloy layer 3 has a function as an obstacle layer preventing diffusion of Cu from the substrate 1 so as to improve heat resistance, it is desirable that the thickness of the nickel-or-nickel-alloy layer 3 be 0.1 μm or more.

If the average crystal grain size of the nickel-or-nickel-alloy layer 3 is less than 0.01 μm, bending machinability and the heat resistance are deteriorated; and if it is more than 0.5 μm, it is hard to incorporate nickel from the nickel-or-nickel-alloy layer 2 when the copper-tin alloy layer 4 is formed while reflow treatment, and it is hard to include nickel in $Cu_6Sn_5$. If the crystal grain of the nickel-or-nickel-alloy layer 3 is rough and large, it is easy to be worn away; e.g., a number until exposure of the substrate by a sliding test may be less than 30 times. The average crystal grain size of the nickel-or-nickel-alloy layer 3 is desirably 0.4 μm or less, more desirably 0.3 μm or less, even desirably 0.2 μm or less.

The standard deviation of the crystal grain size/the average crystal grain size of the nickel-or-nickel-alloy layer 3 shows an index of distribution of the crystal grain size; and if this value is 1.0 or less, Ni content in $(Cu, Ni)_6Sn_5$ alloy is increased even if a thickness of a copper plating layer is large, and the boundary surface to the tin layer can be formed into the sharp uneven shape. The standard deviation of the crystal grain size/the average crystal grain size of the nickel-or-nickel-alloy layer 3 is preferably 0.95 or less, more preferably 0.9 or less.

If the arithmetic mean roughness Ra of a surface in contact with the copper-tin alloy layer 4 of the nickel-or-nickel-alloy layer 3 is more than 0.5 μm, protruded parts are formed on the nickel-or-nickel-alloy layer 3. When the nickel-or-nickel-alloy layer 3 is worn, the protruded parts are antecedently worn, so that abrasion powder is generated and shows grinding effect, and abrasion progress may be faster; as a result, it is difficult to increase the number until the substrate is exposed in the sliding test to 30 times or more. A lower limit of the arithmetic mean roughness Ra of the surface in contact with the copper-tin alloy layer 4 of the nickel-or-nickel alloy layer 3 is preferably 0.01 μm or more, more preferably 0.02 μm or more; and an upper limit is preferably 0.4 μm or less, more preferably 0.3 μm.

The copper-tin alloy layer 4 is a compound alloy layer containing $Cu_6Sn_5$ as main ingredient, in which copper in the $Cu_6Sn_5$ is in part substituted by nickel, and is formed by forming a nickel-or-nickel-alloy plating layer, a copper plating layer, and a tin plating layer on the substrate 2 in order and reflowing, as described later. The copper-tin alloy layer 4 has an average crystal grain size preferably not less than 0.2 μm and not more than 1.5 μm, and in part appears at a surface of the tin layer 5. It is preferable that this $Cu_6Sn_5$ alloy layer 4a contain nickel not less than 1 at % and not more than 25 at %.

If the nickel content in the $Cu_6Sn_5$ alloy layer 4a is less than 1 at %, the compound alloy layer in which copper in $Cu_6Sn_5$ is in part substituted by nickel is not formed, the sharp uneven shape cannot be easily formed. If it is more than 25 at %, the shape of the copper-tin alloy layer 4 tends to be too minute; if the copper-tin alloy layer 4 is too minute, there is a case in which the dynamic friction coefficient cannot be 0.3 or less. A lower limit of the nickel content in the $Cu_6Sn_5$ alloy layer 4a is preferably 2 at % or more; and an upper limit is preferably 20 at % or less.

Furthermore, between the $Cu_6Sn_5$ alloy layer 4a and the nickel-or-nickel-alloy layer 3, a $Cu_3Sn$ alloy layer 4b partially exists. Accordingly, the $Cu_6Sn_5$ alloy layer 4a is formed over either one of the $Cu_3Sn$ alloy layer 4b on the nickel-or-nickel-alloy layer 3 or the nickel-or-nickel-alloy layer 3 where the $Cu_3Sn$ alloy layer 4b does not exist, or formed to span them. In this case, it is preferable that a volume ratio of the $Cu_3Sn$ alloy layer 4b to the $Cu_6Sn_5$ alloy layer 4a be 20% or less.

Since the $Cu_6Sn_5$ alloy layer 4a is formed on the nickel-or-nickel-alloy layer 3, or since the $Cu_6Sn_5$ alloy layer 4a is formed on the $Cu_3Sn$ alloy layer 4b formed at least on a part of the nickel-or-nickel-alloy layer 3, it is advantageous to make the surface of the copper-tin alloy layer 4 the sharp uneven shape. In this case, if a volume ratio of the $Cu_3Sn$ alloy layer 4b to the $Cu_6Sn_5$ alloy layer 4a is more than 20%, the $Cu_6Sn_5$ alloy layer 4a cannot vertically grow enough and the $Cu_6Sn_5$ alloy layer 4a is hard to be the sharp uneven shape. The volume ratio of the $Cu_3Sn$ alloy layer 4b to the $Cu_6Sn_5$ alloy layer 4a is preferably 15% or less, more preferably 10% or less.

A boundary face between the copper-tin alloy layer 4 and the tin layer 5 is formed to be the sharp uneven shape as described above, the copper-tin alloy layer 4 in part appears on the surface of the tin layer 5. It is desirable that an average thickness of the copper-tin alloy layer 4, which is an average height Rc of the copper-tin alloy layer 4÷an average thickness of the copper-tin alloy layer 4 measured by showing the copper-tin alloy layer 4 out on the surface by dissolving and removing the tin layer 5 (below, it is denoted the average height Rc of the copper-tin alloy layer 4/the average thickness 4), be 0.7 or more.

If the average height Rc of the copper-tin alloy layer 4/the average thickness of the copper-tin alloy layer 4 is less than 0.7, the $Cu_6Sn_5$ alloy layer 4a is hard to be the sharp uneven shape and the dynamic friction coefficient is hard to be 0.3 or less. Moreover, the number until the substrate 2 is exposed by the sliding test is decreased, and it may be less than 30. The average height Rc of the copper-tin alloy layer 4/the average thickness of the copper-tin alloy layer 4 is preferably 0.75 or more, more preferably 0.8 or more.

The tin layer 5 has the average thickness not less than 0.2 μm and not more than 1.2 μm. On the surface of the tin layer 5, there are a section in which upheaved tin solidification parts 5a exist like islands and a section made of a tin layer 5b (below, "a base tin layer") in which the tin solidification parts 5a do not exist (refer to FIG. 2). The tin solidification parts 5a have an average diameter not less than 10 μm and not more than 1000 μm and an area ratio not less than 1% and not more than 90% to the surface of the tin layer 5. In this case, the average thickness of the tin layer 5 is measured including the tin solidification parts 5a.

Figure 2:
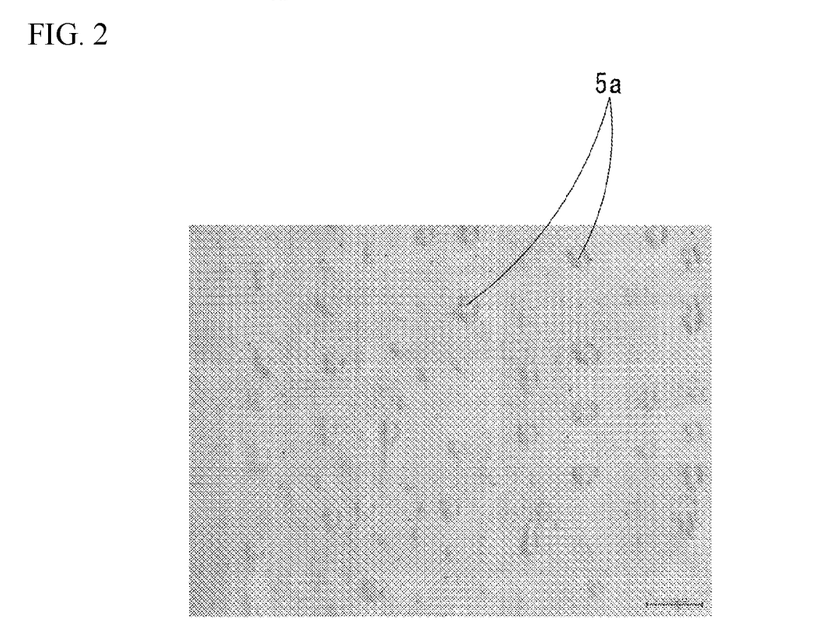
FIG. 2 is a microscopy photograph of a surface of Example 4.

Some of the tin solidification parts 5a have a round shape in a plan view; and others have a linear shape, an elliptical shape and the like with a direction. Accordingly, an average diameter of the solidification parts 5a is an average value of a major axis and a minor axis on an outer peripheral edge in a direction along a surface of the tin layer 5; the major axis is a length of a longest straight line drawn in the tin solidification parts so as not to be in contact with the outer peripheral; and the minor axis is a length of a longest straight line drawn along a direction perpendicularly crossing to the major axis in a particle so as not to be in contact with the outer peripheral. Moreover, the tin solidification parts 5a existing like islands means that the tin solidification parts 5a which are the round shape, the linear shape, elliptical shape and the like in the plan view exist with mutual intervals on the surface of the tin layer 5.

A thickness of the tin solidification parts 5a is not less than 0.1 μm and not more than 10 μm. The thickness in this case is a protruded height of the tin solidification parts 5a from a surface of the base tin layer 5b as a reference excepting the tin solidification parts 5a.

On a surface of the other part than the tin solidification parts 5a on the tin layer 5, the copper-tin alloy layer 4 is partially exposed as described above, and an exposed area ratio thereof is not less than 1% and not more than 60%. The exposed area ratio of the copper-tin alloy layer 4 is a ratio to an area of the surface of the base tin layer 5b.

In the terminal material 1 with such a structure, the boundary face between the copper-tin alloy layer 4 and the tin layer 5 is the sharp uneven shape; a structure is a compound of the hard copper-tin alloy layer 4 and the tin layer 5 in a depth range of several hundred nm from the surface of the tin layer 5, and the hard copper-tin alloy layer 4 in part appears slightly on the tin layer 5; soft tin therearound works as lubricant; so that low dynamic friction coefficient as 0.3 or lower can be achieved. Since the exposed area ratio of the copper-tin alloy layer 4 is in a limited range of not less than 1% and not more than 60%, excellent electric connection characteristic of the tin layer 5 is not deteriorated.

Since the tin solidification parts 5a exist on the surface like islands, and tin remains in these parts where the tin solidification parts 5a exist even when used in high temperature, oxidation of the copper-tin alloy layer 4 in these sections is prevented from expanding and increase of contact resistance can be suppressed.

In addition, in the tin-plated copper terminal material 1, the number until the substrate appears can be 30 or more by the sliding test sliding back-and-forth on a surface of a same material with a sliding length 1.0 mm, a sliding speed 80 mm/min, and a contact load 5N. A surface glossiness of the surface can be 500 GU or more. An upper limit of the dynamic friction coefficient is preferably 0.29 or less, more preferably 0.28 or less.

Furthermore, the glossiness is also high in a case in which the average crystal grain size of the copper-tin alloy layer 4 is not less than 0.2 μm and not more than 1.5 μm and the exposed area ratio of the copper-tin alloy layer 4 at the surface of the base tin layer 5b is not less than 1% and not more than 60%.

Next, a method of manufacturing the tin-plated copper terminal material 1 will be explained.

A board material made of pure copper or copper alloy such as Cu—Mg—P type or the like is prepared as the substrate 2. After cleaning a surface by treatments such as degreasing, pickling and the like on this board material, treatments of nickel plating, copper plating, and tin plating are carried out in this order.

It is adequate to use a general nickel plating bath for nickel plating; e.g., a sulfuric acid bath containing sulfuric acid ($H_2SO_4$) and nickel sulfate ($NiSO_4$) as main ingredients can be used.

Temperature is not less than 20° C. and not more than 60° C. and current density is 5 to 60 A/dm$^2$ in the plating bath. It is because, if it is less than 5 A/dm$^2$, the average crystal grain size of the nickel-or-nickel-alloy layer is not minute; the surface roughness Ra of the surface in contact with the copper-tin alloy layer is large; the nickel content contained in $(Cu, Ni)_6Sn_5$ alloy is reduced; and the sharp uneven copper-tin alloy layer is not formed.

A film thickness of this nickel plating layer is not less than 0.05 μm and not more than 1.0 μm. It is because if it is less than 0.05 μm, the nickel content in $(Cu, Ni)_6Sn_5$ alloy is reduced and the sharp uneven copper-tin alloy layer is not formed; and if it is more than 1.0 μm, bending machining and the like are difficult.

It is adequate to use a general copper plating bath for copper plating; e.g., a copper sulfate bath containing copper sulfate ($CuSO_4$) and sulfuric acid ($H_2SO_4$) as main ingredients can be used. For the plating bath, temperature is 20 to 50° C. and electric current density is 1 to 30 A/dm$^2$.

A film thickness of the copper plating layer formed by this copper plating is not less than 0.05 μm and not more than 0.40 μm. It is because that if it is less than 0.05 μm the nickel content contained in $(Cu, Ni)_6Sn_5$ alloy is large and the shape of copper tin alloy is too minute; if it is more than 0.4 μm the nickel content contained in $(Cu, Ni)_6Sn_5$ alloy is small and the sharp uneven copper-tin alloy layer is not formed.

For a plating bath for forming a tin plating layer, a general tin plating bath is adequate; e.g., a sulfuric bath containing sulfuric acid ($H_2SO_4$) and stannous sulfate ($SnSO_4$) as main ingredients can be used. For the plating bath, temperature is 15 to 35° C. and electric current density is 1 to 30 A/dm$^2$.

A film thickness of this tin plating layer is not less than 0.5 μm and not more than 1.5 μm. If the thickness of the tin plating layer is less than 0.5 μm, the tin layer is thin after reflowing, the electric connection characteristic is deteriorated, and tin solidification objects are not grown up to sufficient size; and if it is more than 1.5 μm, tin on the surface is excessive, the tin solidification objects are excessively coarse and large, and the copper-tin alloy layer is less exposed on the surface, so that it is difficult to reduce the dynamic friction coefficient to 0.3 or less.

Plating treatment is carried out; then, reflow treatment is carried out by heating.

Namely, the reflow treatment is a treatment having the following process: a heat treatment step, in which carried out are a primary heating treatment in which a treated material after plating is heated in a heating furnace with CO reduction atmosphere to 240° C. or higher at heating rate 20 to 75° C./sec, and a secondary heating treatment heating at temperature 240 to 300° C. after the primary heating treatment; a primary cooling step, cooling at cooling rate 30° C./second or less for 2 to 15 seconds after the heat treatment step; and a secondary cooling step, cooling at cooling rate 100 to 300° C./second for 0.5 to 5 seconds after the primary cooling. The primary cooling step is carried out by air cooling; and the secondary cooling step is carried out by water cooling using water of 10 to 90° C.

The substrate 2 is formed into a tape shaped material, plated by the above described treatments while driven in a length direction, and then reflow treated. In this reflow treatment, the plated substrate (the tape shaped material) is heated by hot blast blown against a surface thereof while running in the length direction in a reflow treatment furnace. The hot blast at this time is blown along a driven direction of the substrate (the tape shaped material), (from an upper stream side to a lower stream side) at substantially the same rate as a driven rate of the substrate; and circular tin solidification parts are formed.

By carrying out this reflow treatment in the reduction atmosphere, it is prevented to generate a tin oxide film having high melting point on the surface of the tin plating, so it is possible to carry out the reflow treatment at lower temperature and shorter time, and it is facilitated to manufacture the desired intermetallic compound structure.

In this case, since the heating treatment process has the two steps, it is facilitated to generate the tin solidification parts. By rapidly heating in the primary heating treatment so as to make a high temperature state of 240° or more in an early stage and then carrying out the secondary heating treatment, cohesion time of the tin layer on the surface is maintained long; thereby some of the copper-tin alloy layer having a boundary surface to the tin layer which is sharp and uneven appear on the surface, and the melted tin is repelled by the copper-ting alloy layer and cohere.

In this case, by blowing a hot blast along the running direction against the surface of the substrate, it is possible to change the shape of the tin solidification parts into oval, linear and the like other than circle by changing relative wind velocity thereof (=speed of the hot blast−the running speed of the substrate).

The primary heating treatment is a treatment of rising temperature, though the temperature in the secondary heating treatment may be changed in the range not less than 240° C. and not more than 300° C. or may be maintained at a specific temperature; for example, various aspects may be possible as follows: a case in which the temperature is increased to the peak temperature at an appropriate speed after the primary heating treatment and then immediately carried out the primary cooling step; a case in which the temperature is increased to the peak temperature and then heated and maintained; a case in which the temperature is not increased from attainment temperature in the primary heating treatment and then heated and maintained; and a case in which the attainment temperature in the primary heating treatment is higher temperature than 240° C., e.g., 250° C., and then the temperature is decreased from that to a prescribed temperature in the above temperature range, e.g., 240° C.

Since the cooling process has the two steps so as to provide the primary cooling step with small cooling speed, copper atoms are gently diffused in tin grains and grow in a desired intermetallic compound structure. Then, the growth of the intermetallic compound layer is terminated by rapid cooling after that, and a desired structure can be fixed.

Copper and tin electrodeposited by high current density are low in stability, so that alloying occurs and crystal grains are enlarged even in room temperature; and it is difficult by a reflow treatment to make the desired intermetallic compound structure. Accordingly, it is desired to carry out the reflow treatment immediately after plating treatment. Specifically, it is necessary to reflow within 15 minutes, preferably within 5 minutes. It is not a problem that a leaving time after plating is short: it is about one minute after in accordance with a structure on a usual treatment line.

EXAMPLES

A substrate was a copper alloy (Mg: 0.5% by mass to 0.9% by mass inclusive-P: 0.04% by mass or less) with a board thickness 0.25 mm, and nickel (Ni) plating, copper (Cu) plating, and tin (Sn) plating were carried out in order. In this case, plating conditions of the nickel plating, the copper plating, and the tin plating were the same in all Examples and Comparative Example, as shown in Table 1. In Table 1, Dk is current density of a cathode and ASD is an abbreviation of $A/dm^2$.

TABLE 1

|  | Nickel Plating | | Copper Plating | | Tin Plating | |
|---|---|---|---|---|---|---|
| Plating Solution Composition | Nickel Sulfate Sulfuric Acid | 300 g/L 2 g/L | Copper Sulfate Sulfuric Acid | 250 g/L 50 g/L | Tin Sulfate Sulfric Acid Additive | 75 g/L 85 g/L 10 g/L |
| Solution Temperature | 45° C. | | 25° C. | | 25° C. | |
| Dk | 20 ASD | | 5 ASD | | 2 ASD | |

After carrying out the plating treatments, a reflow treatment was carried out by heating. The reflow treatment was carried out one minute after the last tin plating: a heating process (a primary heating treatment, a secondary heating treatment), a primary cooling step, and a secondary cooling step were carried out. Thicknesses of the respective plating layer (thicknesses of Ni plating, Cu plating, and Sn plating), reflow conditions (an increase speed of temperature and attainment temperature in the primary heating treatment, an increase speed of temperature and peak temperature in the secondary heating treatment, a holding time at the peak temperature (a time of the secondary heating treatment), a relative speed of hot blast to the substrate (a relative wind speed), a primary cooling speed, a primary cooling time and a secondary cooling speed) were shown in Table 2.

TABLE 2

| | | Thickness of Plating Layer (μm) | | | Reflowing Condition | | | | | | | | |
|---|---|---|---|---|---|---|---|---|---|---|---|---|---|
| | | | | | Primary Heating Treatment Rate | Atteinment Temperature (° C.) in Primary Heating | Secondary Heating Treatment (rising) Rate | Secondary Heating Treatment Time | Relative Wind Speed | Peak Temperature | Primary Cooling Rate | Primary Cooling Time | Secondary Cooling Rate |
| | | Ni | Cu | Sn | (° C./s) | Instrument | (° C./s) | (s) | (m/s) | (° C.) | (° C./s) | (s) | (° C./s) |
| Examples | 1 | 0.07 | 0.15 | 1.4 | 60 | 250 | 10 | 15 | 0 | 300 | 10 | 3 | 170 |
| | 2 | 0.4 | 0.25 | 1 | 40 | 250 | 19 | 2 | 10 | 270 | 20 | 5 | 250 |
| | 3 | 0.15 | 0.3 | 1.4 | 50 | 240 | 10 | 5 | 0 | 270 | 30 | 5 | 170 |
| | 4 | 0.3 | 0.35 | 0.8 | 40 | 240 | 0 | 3 | 0 | 240 | 20 | 5 | 200 |
| | 5 | 0.45 | 0.2 | 0.6 | 40 | 240 | 0 | 2 | 0 | 240 | 20 | 5 | 170 |
| | 6 | 0.75 | 0.25 | 0.5 | 30 | 260 | 19 | 4 | 0 | 300 | 20 | 10 | 300 |
| | 7 | 0.6 | 0.35 | 0.5 | 40 | 240 | 0 | 1 | 0 | 240 | 30 | 5 | 300 |
| | 8 | 0.3 | 0.15 | 0.7 | 40 | 240 | 0 | 2 | 0 | 240 | 20 | 5 | 250 |
| | 9 | 0.4 | 0.2 | 1.2 | 20 | 250 | 18 | 4 | 10 | 270 | 20 | 5 | 170 |
| | 10 | 0.15 | 0.3 | 1.5 | 30 | 240 | 10 | 14 | 0 | 300 | 10 | 3 | 150 |
| | 11 | 0.35 | 0.35 | 0.7 | 40 | 250 | 19 | 3 | 0 | 270 | 20 | 5 | 170 |
| | 12 | 0.15 | 0.2 | 0.6 | 60 | 260 | 19 | 1 | 0 | 270 | 30 | 8 | 300 |
| | 13 | 0.25 | 0.15 | 1.1 | 30 | 240 | 0 | 3 | 0 | 240 | 20 | 5 | 170 |
| | 14 | 0.1 | 0.1 | 0.8 | 40 | 240 | 0 | 3 | 0 | 240 | 30 | 5 | 170 |
| | 15 | 0.2 | 0.4 | 0.9 | 50 | 240 | 0 | 3 | 0 | 240 | 30 | 5 | 250 |
| | 16 | 0.1 | 0.3 | 0.5 | 75 | 240 | 0 | 1 | 0 | 240 | 30 | 6 | 300 |
| | 17 | 0.3 | 0.2 | 1.3 | 75 | 260 | 10 | 3 | 10 | 270 | 10 | 3 | 170 |
| | 18 | 0.45 | 0.25 | 1.2 | 20 | 260 | 10 | 8 | 10 | 300 | 10 | 15 | 200 |
| | 19 | 0.25 | 0.1 | 1 | 20 | 250 | 10 | 2 | 0 | 270 | 20 | 5 | 170 |
| | 20 | 0.2 | 0.25 | 0.9 | 50 | 240 | 0 | 2 | 0 | 240 | 30 | 2 | 250 |
| | 21 | 0.068 | 0.15 | 0.7 | 40 | 240 | 10 | 12 | 0 | 270 | 10 | 5 | 170 |
| | 22 | 0.35 | 0.1 | 0.6 | 30 | 240 | 0 | 3 | 0 | 240 | 20 | 5 | 170 |

TABLE 2-continued

| | | Thickness of Plating Layer (μm) | | | Primary Heating Treatment Rate | Atteinment Temperature (° C.) in Primary Heating | Secondary Heating Treatment (rising) Rate | Secondary Heating Treatment Time | Relative Wind Speed | Peak Temperature | Primary Cooling Rate | Primary Cooling Time | Secondary Cooling Rate |
|---|---|---|---|---|---|---|---|---|---|---|---|---|---|
| | | Ni | Cu | Sn | (° C./s) | Instrument | (° C./s) | (s) | (m/s) | (° C.) | (° C./s) | (s) | (° C./s) |
| | 23 | 0.35 | 0.25 | 1.1 | 40 | 250 | 10 | 2 | 10 | 270 | 10 | 6 | 250 |
| | 24 | 0.15 | 0.35 | 0.6 | 20 | 240 | 0 | 2 | 0 | 240 | 30 | 3 | 200 |
| | 25 | 0.5 | 0.15 | 1 | 30 | 240 | 10 | 10 | 10 | 270 | 10 | 8 | 170 |
| | 26 | 0.4 | 0.15 | 0.8 | 30 | 240 | 0 | 3 | 0 | 240 | 20 | 3 | 200 |
| | 27 | 0.2 | 0.35 | 0.6 | 50 | 240 | 0 | 3 | 0 | 240 | 30 | 5 | 250 |
| | 28 | 1.0 | 0.2 | 1.4 | 40 | 250 | 10 | 11 | 10 | 300 | 10 | 5 | 170 |
| | 29 | 0.34 | 0.15 | 0.7 | 20 | 240 | 0 | 4 | 0 | 240 | 20 | 5 | 170 |
| | 30 | 0.3 | 0.35 | 0.9 | 30 | 240 | 0 | 4 | 0 | 240 | 20 | 5 | 170 |
| Comparative Examples | 1 | 0.09 | 0.15 | 1.8 | 80 | 250 | 5 | 20 | 0 | 300 | 30 | 3 | 170 |
| | 2 | 0.54 | 0.15 | 0.5 | 40 | 240 | 0 | 1 | 10 | 240 | 40 | 4 | 300 |
| | 3 | 0.31 | 0.45 | 1.3 | 40 | 240 | 0 | 1 | 10 | 240 | 20 | 1 | 350 |
| | 4 | 0.23 | 0.35 | 0.45 | 50 | 240 | 10 | 10 | 5 | 270 | 20 | 5 | 200 |
| | 5 | 0.03 | 0.15 | 1.5 | 75 | 250 | 10 | 18 | 0 | 310 | 20 | 5 | 200 |
| | 6 | 0.37 | 0.1 | 1.3 | 30 | 240 | 10 | 16 | 0 | 270 | 20 | 5 | 170 |
| | 7 | 1.12 | 0.4 | 0.7 | 40 | 260 | 5 | 12 | 5 | 300 | 20 | 5 | 200 |
| | 8 | 0.6 | 0.35 | 0.8 | 40 | 300 | — | — | 0 | 300 | 30 | 5 | 150 |
| | 9 | 0.72 | 0.03 | 1.1 | 40 | 240 | 10 | 3 | 10 | 270 | 5 | 14 | 150 |
| | 10 | 0.64 | 0.1 | 0.9 | 40 | 230 | 25 | 4 | 12 | 280 | 20 | 5 | 180 |

Regarding these samples, measured were followings: an average thickness of the tin layer (an average Sn thickness), an average thickness of a nickel-or-nickel-alloy layer, a surface roughness Ra of a nickel-or-nickel-alloy layer, an average crystal grain size of a nickel-or-nickel-alloy layer, "a standard deviation of crystal grain size"/"an average crystal grain size" in a nickel-or-nickel-alloy layer, an average crystal grain size of the copper-tin alloy layer, nickel content in the $(Cu, Ni)_6Sn_5$ alloy layer, a volume ratio of the $Cu_3Sn$ alloy layer to the $Cu_6Sn_5$ alloy layer, an exposed area ratio of the copper-tin alloy layer on the surface of the tin layer, and an average height Rc of the copper-tin alloy layer/an average thickness of the copper-tin alloy layer; and dynamic friction coefficient, abrasion resistance, glossiness, and electrical reliability were assessed. In tables, the nickel-or-nickel-alloy layer is denoted as "Ni-or-Ni-alloy layer".

(Method of Measuring Thickness of Layers)

The average thickness of the nickel-or-nickel-alloy layer and the average thickness of the tin layer and the copper-tin alloy layer were measured by a fluorescent X-ray film thickness meter (SEA5120A) made by SII Nanotechnology Co., Ltd.

The average thickness of the tin layer and the average thickness of the copper-tin alloy layer were measured as follows: first, a thickness of a whole tin layers of a sample after reflowing (although that is a thickness including the copper-tin alloy layer, the base tin layer, and the tin solidification objects, it is calculated as an average thickness because the tin solidification objects are uneven) was measured and then the tin layer was removed by soaking for five minutes in etching solution for removing layer consisting of a component not corroding the copper-tin alloy layer, so that the copper-tin alloy layer that was an under layer thereof was exposed, and after a thickness of the copper-tin alloy layer was measured, the thickness of the tin layer is defined as (the thickness of the whole tin layers–the thickness of the copper-tin alloy layer).

The thickness of the nickel-or-nickel-alloy layer was measured by removing the tin layer and the copper-tin alloy layer by soaking for about one hour in etching solution for removing a layer consisting of a component not corroding the nickel-or-nickel-alloy layer, so that the nickel-or-nickel-alloy layer that was an under layer thereof was exposed and the thickness of the nickel-or-nickel-alloy layer was measured.

(Method of Measuring Nickel Content in $(Cu, Ni)_6Sn_5$ Alloy Layer and Existence of $Cu_3Sn$ Alloy Layer)

Regarding the nickel content in the $(Cu, Ni)_6Sn_5$ alloy layer and existence of the $Cu_3Sn$ alloy layer, position of alloy was found by observation of a cross sectional STEM image and EDS area analysis, and the content of nickel in the $(Cu, Ni)_6Sn_5$ alloy layer was obtained by point analysis and the existence of the $Cu_3Sn$ alloy layer was obtained by linear analysis in a depth direction. In addition to cross section observation, an existence of the $Cu_3Sn$ alloy layer in an extensive area was judged by measuring an X-ray diffraction pattern by $CuK\alpha$ ray after removing the tin layer by soaking in etching solution for removing tin plating coated film so that the copper-tin alloy layer that was an under layer thereof was exposed. Measuring condition was as follows.

Made by PANalytical: MPD1880HR
Bulb used: $CuK\alpha$ ray
Voltage: 45 kV
Electric current: 40 mA (Method of Measuring Average Crystal Grain Size of Copper-Tin Alloy Layer)

The average crystal grain size of the copper-tin alloy layer was measured from a result of a cross section EBSD analysis after reflowing. Samples were collected from material after the reflow treatment step was finished, a cross section perpendicular to the rolling direction was observed, and an average value and a standard deviation of crystal grain size were measured. After mechanical polishing was carried out using waterproof abrasive paper and diamond abrasive grain, finish polishing was carried out using colloidal silica solution.

Then, by an EBSD measurement device (S4300-SE made by HITACHI Co., OIM Data Collection made by EDAX/TSL Co. (current AMETEK Co.)) and analyzation software (OIM Data Analysis ver. 5.2 made by EDAX/TSL Co.

(current AMETEK Co.)), misorientation of crystal grains was analyzed by electronic beam of 15 kV of acceleration voltage, 0.1 μm step of a measuring distance over a measuring area 3.0 μm×250 μm.

CI values at the measuring points were calculated by the analyzation software OIM, and the CI value that is not more than 0.1 was excluded from the analyzation of the crystal grain size. Regarding crystal grain boundary, a crystal grain boundary map was made from a result of observing two-dimensional cross section, so that the crystal grain boundary was between two adjacent crystals in which alignment misorientation is 15° or less excluding twin crystal. Regarding a method of measuring the crystal grain size, the crystal grain size was an average value of a major axis (a length of a longest straight line which can be extended in a grain under a condition of not being contact with the grain boundary) and a minor axis (along a direction perpendicular to the major axis, a length of a longest straight line which can extend in a grain under a condition of not being contact with the grain boundary) of a crystal grain. 50 or more crystal grains were measured.

(Method of Measuring Average Crystal Grain Size of Nickel-or-Nickel-Alloy Layer)

The average crystal grain size of the nickel-or-nickel-alloy layer was observed at a cross section by a scanning ion microscope. Regarding a method of measuring the crystal grain size, the crystal grain size was an average value of a major axis (a length of a longest straight line which can be extended in a grain under a condition of not being contact with the grain boundary) and a minor axis (along a direction perpendicular to the major axis, a length of a longest straight line which can extend in a grain under a condition of not being contact with the grain boundary) of a crystal grain.

(Method of Measuring Standard Deviation of Crystal Grain/Average Crystal Grain Size of Nickel-or-Nickel-Alloy Layer)

Standard deviation to the average crystal grain size obtained above was found, and the standard deviation/the average crystal grain size was calculated.

(Method of Measuring Arithmetic Average Roughness Ra of Nickel-or-Nickel-Alloy Layer)

Arithmetic average roughness Ra of a surface of the nickel-or-nickel-alloy layer in contact with the copper-tin alloy layer was found as follows: the tin layer and the copper-tin alloy layer were removed by soaking in etching solution for removing tin plating layer so that the nickel-or-nickel-alloy layer that is an under layer thereof was exposed, then using a laser microscope (OLS3000) made by Olympus Co., Ltd., seven points in a longitudinal direction, seven points in a short direction, 14 points in total of Ra were measured on condition of objective lens of 100 magnification (a measuring view field 128 μm×128 μm) and averaged.

(Method of Measuring Exposed Area Ratio of Copper-Tin Alloy Layer)

The exposed area ratio of the copper-tin alloy layer was observed by a scanning ion microscope at a region of 100×100 μm after removing a surface oxide film. According to measurement principle, $Cu_6Sn_5$ alloy existing in a depth region from an outermost surface to about 20 nm is imaged white; accordingly, using image processing software, a ratio of an area of white regions to an area of regions excluding the tin solidification parts in the measured region was determined as the exposed area ratio of the copper-tin alloy layer.

(Method of Measuring Volume Ratio of $Cu_6Sn_5$ Alloy Layer and $Cu_3Sn$ Alloy Layer)

The volume ratio of the $Cu_6Sn_5$ alloy layer and the $Cu_3Sn$ alloy layer in the copper-tin alloy layer were observed at the cross section by the scanning ion microscope.

(Method of Measuring Average Height Rc of Copper-Tin Alloy Layer/Average Thickness of Copper-Tin Alloy Layer)

The average height Rc of the copper-tin alloy layer was obtained from an average value of Rc measured at seven points in a longitudinal direction and seven points in a short direction, 14 points in total, on condition of objective lens of 100 magnification (a measuring view field 128 μm×128 μm) using the laser microscope (OLS30000) made by Olympus Corporation, after removing the tin layer by soaking in etching solution for removing tin-plating coating film to expose the copper-tin alloy layer that is an under layer thereof. By dividing the average height Rc obtained by this method by the average thickness of the copper-tin alloy layer, the average height Rc of the copper-tin alloy layer/the average thickness of the copper-tin alloy layer was calculated.

(Method of Measuring Average Diameter, Maximum Thickness, and Area Ratio of Tin Solidification Parts)

The average diameter of the tin solidification parts was observed on condition of objective lens of 5 magnification (a measuring view field 1880 μm×1410 μm) using an optical microscope made by Olympus Corporation. Random four sections were selected, it was obtained from an average value of a major axis of the tin solidification parts (a length of a longest straight line which can be extended in the tin solidification parts on condition of not being in contact with the outer peripheral) and a minor axis (a length of a longest straight line in a direction perpendicular to the major axis which can be extended in the grain on condition of not being in contact with the outer peripheral) in the section.

The thickness of the tin solidification parts were observed on condition of objective lens of 10 magnification (a measuring view field 1280 μm×960 μm) using a laser microscope (OLS3000) made by Olympus Corporation. Random four sections were selected, a maximum thickness of the tin solidification parts was measured in the section, and it was obtained from the average value.

Regarding the area ratio of the tin solidification parts, after removing the surface oxide film, an area of 500 μm×500 μm was observed by the scanning ion microscope. The parts of the tin solidification parts are imaged black, so that an area ratio of black areas to a whole area of the measuring area was determined as the area ratio of the tin solidification parts using image processing software. Following this method, random four areas of 500 μm×500 μm were selected and the average value thereof was determined as the area ratio of the tin solidification parts.

Measuring results of these are shown in Table 3.

TABLE 3

| | | Protruded Sn Solidification Objects | | | Copper-Tin Layer Average | Copper-Tin Layer Exposed | Average Ni-or-Ni-alloy |
|---|---|---|---|---|---|---|---|
| | Average Sn Thickness (μm) | Average Diameter (μm) | Surface Area Ratio (%) | Maximum Thickness (μm) | Crystal Grain Size (μm) | Surface Ratio (%) | Layer Thickness (μm) |
| Examples 1 | 1.1 | 980 | 79 | 8 | 0.85 | 4 | 0.05 |
| 2 | 0.7 | 274 | 30 | 5 | 1.07 | 21 | 0.4 |
| 3 | 1.1 | 496 | 39 | 10 | 0.32 | 16 | 0.15 |

TABLE 3-continued

|  |  |  |  |  |  |  |  |  |
|---|---|---|---|---|---|---|---|---|
|  | 4 | 0.5 | 110 | 27 | 4 | 1.28 | 19 | 0.27 |
|  | 5 | 0.3 | 54 | 12 | 2 | 1.22 | 21 | 0.42 |
|  | 6 | 0.2 | 21 | 3 | 1 | 0.95 | 25 | 0.75 |
|  | 7 | 0.2 | 10 | 2 | 0.1 | 1.02 | 30 | 0.58 |
|  | 8 | 0.4 | 176 | 63 | 3 | 1.14 | 11 | 0.29 |
|  | 9 | 0.9 | 351 | 68 | 6 | 1.26 | 7 | 0.37 |
|  | 10 | 1.2 | 905 | 50 | 7 | 1.41 | 15 | 0.1 |
|  | 11 | 0.4 | 76 | 5 | 3 | 0.52 | 40 | 0.3 |
|  | 12 | 0.3 | 15 | 1 | 0.5 | 1.05 | 30 | 0.14 |
|  | 13 | 0.8 | 322 | 90 | 5 | 1.1 | 3 | 0.23 |
|  | 14 | 0.5 | 219 | 89 | 1.9 | 0.36 | 0.8 | 0.05 |
|  | 15 | 0.6 | 67 | 4 | 2 | 0.84 | 60 | 0.19 |
|  | 16 | 0.2 | 11 | 1 | 0.08 | 0.47 | 43 | 0.08 |
|  | 17 | 1.0 | 589 | 55 | 4 | 1.06 | 14 | 0.26 |
|  | 18 | 0.9 | 796 | 50 | 11 | 1.49 | 17 | 0.41 |
|  | 19 | 0.7 | 103 | 15 | 3 | 1.3 | 26 | 0.22 |
|  | 20 | 0.6 | 51 | 10 | 1 | 1.08 | 27 | 0.18 |
|  | 21 | 0.4 | 822 | 53 | 4 | 1.17 | 2 | 0.048 |
|  | 22 | 0.3 | 213 | 32 | 2 | 0.6 | 20 | 0.34 |
|  | 23 | 0.8 | 425 | 43 | 7 | 0.63 | 17 | 0.31 |
|  | 24 | 0.3 | 47 | 2 | 0.5 | 0.29 | 52 | 0.12 |
|  | 25 | 0.7 | 638 | 64 | 6 | 1.31 | 11 | 0.48 |
|  | 26 | 0.5 | 167 | 54 | 3 | 0.75 | 13 | 0.35 |
|  | 27 | 0.3 | 85 | 22 | 0.9 | 0.23 | 23 | 0.18 |
|  | 28 | 1.1 | 721 | 41 | 9 | 0.82 | 18 | 1.0 |
|  | 29 | 0.4 | 316 | 86 | 5 | 0.8 | 4 | 0.32 |
|  | 30 | 0.6 | 264 | 44 | 8 | 0.91 | 17 | 0.28 |
| Comparative | 1 | 1.5 | 2070 | 80 | 12 | 0.83 | 5 | 0.07 |
| Examples | 2 | 0.2 | 3 | 1 | 0.08 | 0.98 | 8 | 0.52 |
|  | 3 | 1 | 5 | 0.1 | 0.1 | 1.0 | 67 | 0.29 |
|  | 4 | 0.15 | 25 | 0.5 | 0.1 | 1.19 | 71 | 0.21 |
|  | 5 | 1.2 | 1108 | 80 | 10 | 0.79 | 0.9 | 0.01 |
|  | 6 | 1 | 978 | 95 | 9 | 1.14 | 1 | 0.35 |
|  | 7 | 0.4 | 97 | 12 | 1.2 | 1.55 | 60 | 1.1 |
|  | 8 | 0.5 | 0 | 0 | 0 | 1.38 | 58 | 0.58 |
|  | 9 | 0.8 | 177 | 45 | 1.6 | 0.14 | 0.7 | 0.7 |
|  | 10 | 0.6 | 473 | 0.3 | 0.1 | 0.21 | 1 | 0.62 |

|  |  | Ni-or-Ni-alloy Layer Ra (μm) | Ni-or-Ni-alloy Layer Average Crystal Grain Size (μm) | Ni-or-Ni-alloy Layer Crystal Grain Size Standard Caviation/Average Crystel Grain Size | Copper-Tin Layer Rc/Copper-Tin Layer Average Thickness | Ni Content in (Cu•Ni) (ot %) | Cu3Sn Volume Ratio (%) to (Cu,Ni)6Sn5 |
|---|---|---|---|---|---|---|---|
| Examples | 1 | 0.07 | 0.12 | 0.28 | 1.53 | 1 | 15 |
|  | 2 | 0.02 | 0.02 | 0.66 | 1.12 | 18 | 18 |
|  | 3 | 0.31 | 0.36 | 0.83 | 0.95 | 2 | 3 |
|  | 4 | 0.1 | 0.19 | 0.81 | 0.85 | 8 | 1 |
|  | 5 | 0.17 | 0.13 | 0.69 | 1.01 | 16 | 13 |
|  | 6 | 0.09 | 0.24 | 0.74 | 1.35 | 24 | 19 |
|  | 7 | 0.27 | 0.2 | 0.71 | 0.7 | 20 | 15 |
|  | 8 | 0.13 | 0.09 | 0.68 | 1.34 | 8 | 2 |
|  | 9 | 0.03 | 0.008 | 0.64 | 0.83 | 9 | 5 |
|  | 10 | 0.07 | 0.08 | 0.81 | 1.23 | 3 | 9 |
|  | 11 | 0.39 | 0.4 | 0.65 | 0.76 | 13 | 10 |
|  | 12 | 0.02 | 0.17 | 0.68 | 0.97 | 5 | 7 |
|  | 13 | 0.08 | 0.15 | 1.03 | 0.93 | 6 | 4 |
|  | 14 | 0.09 | 0.12 | 0.96 | 0.68 | 0.98 | 6 |
|  | 15 | 0.18 | 0.2 | 0.85 | 1.43 | 9 | 5 |
|  | 16 | 0.04 | 0.05 | 0.71 | 1.02 | 2 | 2 |
|  | 17 | 0.22 | 0.23 | 0.87 | 0.92 | 9 | 9 |
|  | 18 | 0.31 | 0.24 | 0.84 | 1.08 | 17 | 12 |
|  | 19 | 0.5 | 0.27 | 0.9 | 1.52 | 20 | 17 |
|  | 20 | 0.008 | 0.18 | 0.64 | 0.73 | 3 | 3 |
|  | 21 | 0.01 | 0.03 | 0.68 | 0.82 | 10 | 4 |
|  | 22 | 0.09 | 0.15 | 0.72 | 1.51 | 8 | 9 |
|  | 23 | 0.38 | 0.49 | 0.88 | 1.04 | 4 | 10 |
|  | 24 | 0.1 | 0.33 | 0.79 | 1.27 | 11 | 17 |
|  | 25 | 0.25 | 0.41 | 0.61 | 0.73 | 21 | 14 |
|  | 26 | 0.17 | 0.16 | 0.67 | 0.82 | 9 | 2 |
|  | 27 | 0.07 | 0.21 | 0.63 | 1.19 | 3 | 6 |
|  | 28 | 0.34 | 0.22 | 0.87 | 1.4 | 16 | 8 |
|  | 29 | 0.16 | 0.15 | 0.68 | 1.44 | 8 | 21 |
|  | 30 | 0.02 | 0.19 | 0.73 | 1.62 | 7 | 11 |
| Comparative | 1 | 0.07 | 0.15 | 0.21 | 0.51 | 2 | 19 |
| Examples | 2 | 0.25 | 0.2 | 0.81 | 1.05 | 26 | 9 |
|  | 3 | 0.1 | 0.08 | 0.66 | 0.71 | 10 | 8 |
|  | 4 | 0.12 | 0.24 | 0.86 | 0.84 | 5 | 4 |
|  | 5 | 0.03 | 0.1 | 0.17 | 0.62 | 1 | 21 |

TABLE 3-continued

|   |      |      |      |      |     |    |
|---|------|------|------|------|-----|----|
| 6 | 0.11 | 0.07 | 0.73 | 0.76 | 9   | 17 |
| 7 | 0.21 | 0.28 | 0.33 | 1.1  | 22  | 8  |
| 8 | 0.37 | 0.18 | 0.45 | 0.75 | 18  | 11 |
| 9 | 0.55 | 0.65 | 1.15 | 0.44 | 0.7 | 18 |
| 10| 0.38 | 0.25 | 0.52 | 0.88 | 0.9 | 15 |

Dynamic friction coefficient, glossiness, and electric reliability were evaluated as followings.

(Method of Measuring Dynamic Friction Coefficient)

Regarding dynamic friction coefficient, using a friction measuring device (a horizontal load tester, type M-2152ENR) made by Aikoh Engineering Co., Ltd., frictional force was measured between the test pieces simulating a contact part of a male terminal and a female terminal of a fitting type connector: female test pieces of a semi-spherical shape with a radius of 1.5 mm made of the respective samples and a male test piece made of the same material of a board shape, and dynamic friction coefficient was obtained.

Figure 3:
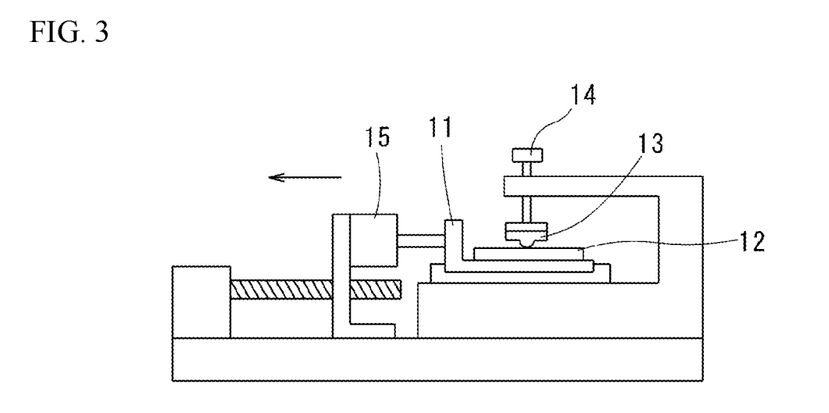
FIG. 3 is a frontal view conceptually showing a device for measuring dynamic friction coefficient.

Explaining with FIG. 3, the male test piece 12 was fixed on a horizontal table 11, a semi-spherical convex surface of the female test piece 13 is disposed on that so that plated surfaces were in contact with each other, a state in which the female test piece 13 pressing the male test piece 12 by a weight 14 at a load P not less than 100 gf and not more than 500 gf was made. In this state in which the load P was applied, a frictional force F was measured by a load cell 15 by dragging the male test piece 12 in the horizontal direction shown by the arrow for 10 mm at a sliding speed 80 mm/min From an average value Fav of the frictional force F and the load P, the dynamic friction coefficient (=Fav/P) was obtained.

(Method of Evaluating Abrasion Resistance)

Regarding the abrasion resistance, using the friction measuring device (the horizontal load tester, type M-2152ENR) made by Aikoh Engineering Co., Ltd., simulating the contact part of the male terminal and the female terminal of the fitting type connector: female test pieces of a semi-spherical shape of a radius 3.0 mm made of the respective samples and a male test piece of the same material of a board shape, it was obtained by carrying out the sliding test repeatedly.

Explaining with FIG. 3, the male test piece 12 was fixed on the horizontal table 11, the semi-spherical convex surface of the female test piece 13 is disposed on that so that plated surfaces were in contact with each other, a state in which the female test piece 13 pressing the male test piece 12 by the weight 14 at the load P not less than 100 gf and not more than 500 gf was made. In this state in which the load P was applied, the male test piece 12 was slid back-and-forth for a distance 1 mm in the horizontal direction shown by the arrow at sliding speed 80 mm/min.

It was obtained from a sliding number until the substrate appeared by repeatedly sliding, where the sliding number was one for one back-and-forth movement. One in which the substrate was not exposed by even 30 or more sliding number was assessed "A"; and one in which the substrate was exposed by less than 30 sliding number was assessed "B".

(Method of Measuring Glossiness)

The glossiness was measured using a glossiness meter (type VG-2PD) made by Nippon Densyoku Industries Co., Ltd., according to JIS Z 8741 with an incident angle 60°.

(Method of Measuring Contact Resistance)

Figure 4:
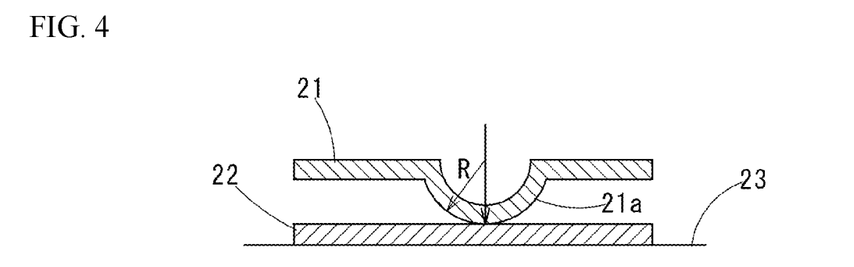
FIG. 4 is a sectional view conceptually showing a test piece for measuring contact resistance.

In order to assess the electric reliability, it was heated in air at 140° C. for 1000 hours and the contact resistance was measured. The method of measuring was as follows: to simulate a contact part of a male terminal and a female terminal of a fitting type connector, as shown in FIG. 4, female test pieces 21 of a semi-spherical shape with a radius R=3 mm were made for the respective samples, and a test was carried out using a male test piece 22, a same kind of board-shape sample. The male test piece 22 was fixed on a horizontal table 23, a semi-spherical convex surface 21a of the female test piece 21 was disposed thereon so that the plated surfaces were in contact with each other, and the contact resistance when a load 0 to 10 N was added on the female test piece 21 was measured; and it was assessed by the contact resistance when the load was 7 N.

These measured results and assessed results are shown in Table 4.

TABLE 4

|          |    | Dynamic Friction Coefficient | Abrasion Resistance | Glossiness ($\times 10^2$ GU) | Contact Resistance (m$\Omega$) | |
|----------|----|---|---|---|---|---|
|          |    |   |   |   | Before Heating | After Heating |
| Examples | 1  | 0.3  | A | 8.3 | 0.5 | 0.6 |
|          | 2  | 0.27 | A | 7.1 | 0.4 | 0.7 |
|          | 3  | 0.28 | A | 7.4 | 0.3 | 2   |
|          | 4  | 0.26 | A | 6.8 | 0.3 | 0.9 |
|          | 5  | 0.26 | A | 6.4 | 0.2 | 0.8 |
|          | 6  | 0.27 | A | 7.2 | 0.4 | 3.3 |
|          | 7  | 0.24 | A | 6.5 | 0.6 | 4.9 |
|          | 8  | 0.28 | A | 7.8 | 0.5 | 1.6 |
|          | 9  | 0.29 | A | 7.6 | 0.3 | 0.4 |
|          | 10 | 0.28 | A | 8.1 | 0.3 | 2.6 |
|          | 11 | 0.23 | A | 5.5 | 0.6 | 4.2 |
|          | 12 | 0.22 | A | 5.2 | 0.8 | 4.7 |
|          | 13 | 0.3  | A | 8.5 | 0.2 | 0.5 |
|          | 14 | 0.29 | A | 7.8 | 0.2 | 0.7 |
|          | 15 | 0.18 | A | 5.1 | 0.3 | 4.2 |

TABLE 4-continued

|  |  | Dynamic | | | Contact Resistance (mΩ) | |
| --- | --- | --- | --- | --- | --- | --- |
|  |  | Friction Coefficient | Abrasion Resistance | Glossiness (×10² GU) | Before Heating | After Heating |
|  | 16 | 0.22 | A | 5.3 | 0.6 | 4.5 |
|  | 17 | 0.28 | A | 7.3 | 0.4 | 2.1 |
|  | 18 | 0.27 | A | 7 | 0.4 | 1.2 |
|  | 19 | 0.26 | A | 5.9 | 0.7 | 2.7 |
|  | 20 | 0.25 | A | 6.1 | 0.5 | 2.1 |
|  | 21 | 0.3 | A | 7.2 | 0.3 | 0.9 |
|  | 22 | 0.24 | A | 7 | 0.5 | 2.1 |
|  | 23 | 0.25 | A | 7.2 | 0.2 | 1.6 |
|  | 24 | 0.21 | A | 5.2 | 0.9 | 3.9 |
|  | 25 | 0.28 | A | 8.3 | 0.5 | 1 |
|  | 26 | 0.27 | A | 7.6 | 0.7 | 1.7 |
|  | 27 | 0.26 | A | 6.9 | 0.7 | 2.3 |
|  | 28 | 0.23 | A | 7.1 | 0.2 | 1.2 |
|  | 29 | 0.29 | A | 8.2 | 0.6 | 0.6 |
|  | 30 | 0.24 | A | 6.7 | 0.5 | 1.6 |
| Comparative Examples | 1 | 0.52 | A | 8.5 | 0.2 | 1.1 |
|  | 2 | 0.31 | A | 7.3 | 0.7 | 5.5 |
|  | 3 | 0.23 | A | 3.9 | 0.8 | 7.1 |
|  | 4 | 0.23 | A | 3 | 0.7 | 7.9 |
|  | 5 | 0.38 | A | 9 | 0.5 | 0.9 |
|  | 6 | 0.43 | A | 8.2 | 0.6 | 0.6 |
|  | 7 | 0.23 | A | 4.3 | 0.4 | 7.3 |
|  | 8 | 0.24 | A | 4.9 | 0.3 | 7.3 |
|  | 9 | 0.63 | B | 9.1 | 0.2 | 0.6 |
|  | 10 | 0.55 | B | 8.8 | 0.3 | 0.7 |

It is obvious from Tables 3 and 4 that the dynamic friction coefficient was small as 0.3 or lower in any of Examples, and good abrasion resistance was shown. Regarding the contact resistance, since it is considered that it cannot be assessed good for electric connection characteristic if it is 5 mΩ or more, it was decided that one in which the contact resistance was 5 mΩ or more after a heating test was assessed to be failed in this assessment; however it was less than 5 mΩ in any of Examples.

By contrast, Comparative Examples showed following defects.

In Comparative Example 1 in which the tin solidification objects were excessively large, the dynamic friction coefficient was excessively large. In contrast in Comparative Example 2 in which the tin solidification objects were excessively small, the contact resistance after heating was assessed to be failed; and the dynamic friction coefficient slightly exceeded 0.3 since the nickel content in the copper-tin alloy was slightly excessive.

In Comparative Example 3, the tin solidification objects were excessively small and the surface area ratio was also low, while an exposed surface ratio of the copper-tin alloy layer was excessively large; as a result, the glossiness and the contact resistance after heating were failed.

In Comparative Example 4, the average thickness of the tin layer was excessively small and the surface area ratio of the tin solidification objects was also low; by contrast, the exposed surface ratio of the copper-tin alloy layer was excessively large, so that the contact resistance after heating was largely deviated from an acceptance criterion.

In Comparative Example 5, the size of the tin solidification objects was excessively large; in contrast, the exposed surface ratio of the copper-tin alloy layer was excessively small (it is supposed as one of the causes was that the film thickness of the nickel layer was not sufficient); as a result, the dynamic friction coefficient was excessively large.

In Comparative Example 6, the surface area ratio of the tin solidification objects was excessive and the dynamic friction coefficient was excessive.

In Comparative Example 7 in which the average crystal grain size of the copper-tin alloy layer was excessive, the glossiness and the contact resistance after heating were failed.

Comparative Example 8 is an example in which generation of the tin solidification objects was not found; and the glossiness and the contact resistance after heating were failed.

In Comparative Example 9, the average crystal grain size of the copper-tin alloy layer was excessively small (it is supposed as one of the causes was that nickel crystals in the nickel layer were excessively grown, so sufficient nickel was not supplied to the copper-tin alloy layer, and the growth of the copper-tin alloy was not sufficient); as a result, the dynamic friction coefficient was excessive, and the abrasion resistance (the sliding test) was also failed.

In Comparative Example 10, the attainment temperature of the primary heating treatment was lower than a set lower limit and for that the relative speed of the hot blast for reflowing was set larger than the others so as to increase heating; however, the growth of the tin solidification objects was biased and the surface area ratio was lower than a set lower limit, as a result, the dynamic friction coefficient an the abrasion resistance were failed.

FIG. 2 is a photomicroscope of a surface of Example 4; it is recognized that tin solidification parts 5a are formed like islands.

INDUSTRIAL APPLICABILITY

The electric connection characteristic and insertion/extraction characteristic are maintained good as terminals, increase of the contact resistance under high temperature is reduced, and high temperature reliability is improved.

REFERENCE SIGNS LIST

1 Tin-plated copper terminal material
2 Substrate

3 Nickel-or-nickel-alloy layer
4 Copper-tin alloy layer
4a $Cu_6Sn_5$ alloy layer
4b $Cu_3Sn$ alloy layer
5 Tin layer
5a Tin solidification part
5b Base tin layer
11 Table
12 Male test piece
13 Female test piece
14 Weight
15 Load cell
21 Female test piece
22 Male test piece
23 Table

The invention claimed is:

1. A tin-plated copper terminal material comprising a nickel-or-nickel-alloy layer, a copper-tin alloy layer, and a tin layer layered in this order on a substrate made of copper or copper alloy, wherein
the tin layer has an average thickness not less than 0.2 μm and not more than 1.2 μm,
the copper-tin alloy layer is a compound alloy layer having $Cu_6Sn_5$ as a main ingredient, in which some copper in the $Cu_6Sn_5$ are substituted with nickel, having an average crystal grain size not less than 0.2 μm and not more than 1.5 μm, and the copper-tin alloy layer has a $Cu_3Sn$ alloy layer partially between the $Cu_6Sn_5$ alloy layer and the nickel-or-nickel-alloy layer,
the copper-tin alloy layer appears in part on a surface of the tin layer and tin solidification parts exist like islands, and
the tin solidification parts have an average diameter in a direction along the surface of the tin layer of not less than 10 μm and not more than 1000 μm and an area ratio to the surface of the tin layer not less than 1% and not more than 90%.

2. The tin-plated copper terminal material according to claim 1, wherein an exposed area ratio of the copper-tin alloy layer is not less than 1% and not more than 60% to the surface of the tin layer except for the tin solidification parts.

3. A method of manufacturing the tin-plated copper terminal material according to claim 1 by forming a nickel-or-nickel-alloy plating layer, a copper plating layer, and a tin plating layer in this order on a substrate made of copper or copper alloy, and then carrying out a reflow treatment, manufacturing the tin-plated copper terminal material formed by laminating a nickel-or-nickel-alloy layer, a copper-tin alloy layer, and a tin layer in order on the substrate, wherein
a thickness of the nickel-or-nickel-alloy plating layer is not less than 0.05 μm and not more than 1.0 μm,
a thickness of the copper plating layer is not less than 0.05 μm and not more than 0.40 μm,
a thickness of the tin plating layer is not less than 0.5 μm and not more than 1.5 μm, and
the reflow treatment comprises followings: a heat treatment step, in which after a primary heating treatment heating to 240° C. or higher at a heating rate not less than 20° C./second and not more than 75° C./second, a secondary heating treatment heating at temperature not less than 240° C. and not more than 300° C. for not less than 2 seconds and not more than 15 seconds is carried out at a temperature rising rate of not less than 0° C./second and not more than 19° C./second; a primary cooling step, cooling at a cooling rate not more than 30° C./second for not less than 2 seconds and not more than 15 seconds after the heat treatment step; and a secondary cooling step, cooling at a cooling rate not less than 100° C./second and not more than 300° C./second after the primary cooling.

4. The method of manufacturing the tin-plated copper terminal material according to claim 3, wherein in the reflow treatment, while the substrate on which the nickel-or-nickel-alloy plating layer, the copper plating layer, and the tin plating layer are formed is driven in a running direction thereof, a hot blast is blown against a surface of the substrate along a driven direction thereof to heat the surface of the substrate.

5. The tin-plated copper terminal material according to claim 1, wherein a volume ratio of the $Cu_3Sn$ alloy layer to the $Cu_6Sn_5$ alloy layer is not more than 20%.

6. The tin-plated copper terminal material according to claim 1, wherein a maximum thickness of the tin solidification parts is not less than 0.1 μm and not more than 10 μm.

* * * * *